US012684345B2

(12) United States Patent
Wilson et al.

(10) Patent No.: US 12,684,345 B2
(45) Date of Patent: Jul. 14, 2026

(54) KEY MANAGEMENT FOR CLOUD-BASED 5G WIRELESS NETWORKS

(71) Applicant: DISH Wireless L.L.C., Englewood, CO (US)

(72) Inventors: Steven Wilson, Englewood, CO (US); Brian Peletz, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 361 days.

(21) Appl. No.: 18/312,391

(22) Filed: May 4, 2023

(65) Prior Publication Data

US 2023/0388787 A1 Nov. 30, 2023

Related U.S. Application Data

(60) Provisional application No. 63/338,437, filed on May 4, 2022.

(51) Int. Cl.

| | |
|---|---|
| *H04L 15/16* | (2006.01) |
| *G06F 9/455* | (2018.01) |
| *G06F 11/36* | (2025.01) |
| *G06F 15/16* | (2006.01) |
| *H04L 9/08* | (2006.01) |
| *H04L 9/30* | (2006.01) |
| *H04W 12/04* | (2021.01) |

(52) U.S. Cl.
CPC ........ *H04W 12/04* (2013.01); *G06F 9/45558* (2013.01); *H04L 9/0825* (2013.01)

(58) Field of Classification Search
CPC ................ H04W 12/04; G06F 9/45558; G06F 2009/45587; G06F 2009/45595; H04L 9/0825; H04L 9/083; H04L 9/0861; H04L 9/0897
USPC ......................................................... 380/270
See application file for complete search history.

(56) References Cited

U.S. PATENT DOCUMENTS

| | | | | |
|---|---|---|---|---|
| 11,132,285 | B1 * | 9/2021 | Sukhyani ............ | G06F 11/3698 |
| 2008/0229428 | A1 * | 9/2008 | Camiel ................ | G06F 16/122 |
| | | | | 707/E17.01 |
| 2013/0124807 | A1 * | 5/2013 | Nielsen ............... | G06F 11/1482 |
| | | | | 711/E12.103 |
| 2016/0294548 | A1 * | 10/2016 | Qian ..................... | H04L 63/062 |
| 2017/0026353 | A1 * | 1/2017 | Chen .................... | H04L 63/061 |
| 2017/0076109 | A1 * | 3/2017 | Kaditz .................. | G16H 40/20 |
| 2017/0228557 | A1 * | 8/2017 | Kaditz ............... | G06F 21/6218 |
| 2018/0219843 | A1 * | 8/2018 | Chen .................... | H04L 63/061 |
| 2020/0267576 | A1 * | 8/2020 | Bedekar ............... | G06F 9/5077 |
| 2021/0051137 | A1 * | 2/2021 | Ruiz .................... | H04L 9/0894 |

(Continued)

FOREIGN PATENT DOCUMENTS

WO WO-2022187796 A1 * 9/2022 ............. H04L 41/40

*Primary Examiner* — Berhanu Shitayewoldetadik
(74) *Attorney, Agent, or Firm* — KW Law, LLP

(57) ABSTRACT

Systems, devices and automated processes are described to securely grant access to components of a cloud-based data processing system implementing a 5G wireless network. Secure mechanisms are provided to generate, store and retrieve private and public encryption keys that are associated with virtual machines implementing the various components of the wireless network. Generated keys can be retrieved from secure storage associated with the data processing system to provide access to the components as desired.

20 Claims, 2 Drawing Sheets

(56)　　　　　　　References Cited

U.S. PATENT DOCUMENTS

2021/0303446 A1*　9/2021　Sukhyani ............ G06F 11/3636
2024/0193255 A1*　6/2024　Quinlan ................ H04L 9/0894

* cited by examiner

KEY MANAGEMENT FOR CLOUD-BASED 5G WIRELESS NETWORKS

PRIORITY CLAIM

This application claims priority to U.S. Provisional Application Ser. No. 63/338,437 filed on May 4, 2022, which is incorporated herein by reference.

TECHNICAL FIELD

The following generally relates to wireless data networks, such as 5G wireless networks. More particularly, the following relates to systems, devices and automated processes to secure encrypted data within a cloud-based data processing system that implements a 5G wireless network or the like.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers and other devices. 5G technologies are capable of supplying much greater bandwidth than was previously available, so it is likely that the widespread deployment of 5G networks could radically expand the number of services available to customers.

Traditionally, data and telephone networks relied upon proprietary designs based upon very specialized hardware and dedicated point-to-point data connections. More recently, industry standards such as the Open Radio Access Network ("Open RAN" or "O-RAN") standard have been developed to describe interactions between the network and various client devices. The O-RAN model follows a virtualized wireless architecture in which 5G base stations ("gNBs") are implemented using separate centralized units (CUs), distributed units (DUs) and radio units (RUs), along with various control planes that provide additional network functions (e.g., 5G Core, IMS, OSS/BSS/IT).

Generally speaking, it is still necessary to implement the RUs with physical transmitters, antennas and other hardware located onsite within broadcast range of the end user's device. Other components of the network, however, can be implemented using a more centralized architecture based upon cloud-based computing resources, such as those available from Amazon Web Services (AWS), VMware and/or others. This provides much better network management, scalability, reliability and redundancy, as well as other benefits. O-RAN CUs, DUs, control planes and/or other components of the network can now be implemented as software modules executed by distributed (e.g., "cloud") computing hardware. Other network functions such as access control, message routing, security, billing and the like can similarly be implemented using centralized cloud computing resources. Often, a CU, DU, control plane or other image is created in software for execution by one or more virtual machines (VMs) operating in parallel within the cloud environment. The many virtual machines can be very rapidly scaled to increase or decrease the available computing capacity as needed.

The use of virtualized hardware provides numerous benefits in terms of rapid deployment and scalability, but it also presents certain technical challenges that have not been encountered in more traditional wireless networks. Unlike traditional wireless networks that scaled through the addition of physical routers, switches and other hardware, RAN networks can scale upwardly and downwardly very quickly as new cloud-based services are deployed and/or existing services are retired or redeployed. Additional network components can be very quickly deployed, for example, through the use of virtual components executing in a cloud environment that can be very quickly duplicated and spawned as needed to support increased demand. Similarly, virtual components can be de-commissioned very quickly with very little cost or effort when network demand allows. The virtual components provide substantial efficiencies, especially when compared to prior networks based upon complex interconnections between geographically-dispersed routers, servers and other physical devices.

One challenge that arises in the context of cloud computing, however, involves maintaining security of such a rapidly-evolving dynamic network. As new networks are developed and deployed, substantial challenges arise in maintaining the security of the network and its many distributed computing components. A substantial desire therefore exists to build systems, devices and automated processes that allow for efficient yet secure access to certain computing resources and services within the cloud-based wireless network. These and other features are described in increasing detail below.

BRIEF SUMMARY

Various embodiments relate to systems, devices and automated processes to provide secure access to certain resources within a cloud-based data processing system, such as that used to implement a 5G or other mobile network. Cryptographic keys or the like can be securely stored in a "vault" storage having limited access, while access mechanisms provide for secure key generation, storage and retrieval for subsequent use by authorized users.

In one example, a data processing system that implements a 5G wireless network suitably comprises a processor and non-transitory digital storage. The digital storage maintains computer-executable instructions for execution by the processor that perform the automated processes described herein. The processor and digital storage may be implemented in conventional computing hardware, if desired, and/or within the context of virtualized "cloud" hardware provided by a service such as Amazon's AMAZON WEB SERVICES (AWS) or the like.

In various embodiments, the automated process to secure access by a client to a component of a cloud-based data processing system that implements a 5G wireless network suitably comprises: associating the component of the cloud-based data processing system with a cryptographic key pair comprising a public key and a private key; storing the private key associated with the component in a secure digital storage and separately storing the public key associated with the component with a management service associated with the cloud based data processing system; subsequently receiving, by the management service, a request for access to the component of the cloud-based data processing system by the client; providing the public key associated with the component of the cloud-based data processing system to the client in response to the request; subsequently receiving, by the secure digital storage, a session request from the client that comprises the public key associated with the component of the cloud-based data processing system; and responsively providing the private key associated with the component of the cloud-based data processing system to a secure component associated with the client, wherein the secure component associated with the client receives the private key and uses the private key to access the component of the cloud-based data processing system without granting a user associated with the client access to the private key.

Still other embodiments provide a data processing system to provide access by a client to a component of a cloud processing system implementing a wireless network. The data processing system suitably comprises a secure data storage and a data management system. The secure data storage is configured to store private keys from asymmetric key pairs associated with the component of the cloud processing system. The data management system is configured to manage a profile associated with the client and to allow authentication of the client. A plugin is configured to augment a secure shell (SSH) protocol executed by the client. If authentication of the client is successful, the plugin retrieves the private key from the secure storage and presents the private key to the component of the cloud processing system to thereby provide access to the component of the cloud processing system.

These example embodiments may be modified or supplemented to create a wide array of additional alternate but equivalent embodiments. Additional detail is provided below.

DETAILED DESCRIPTION

Figure 1:
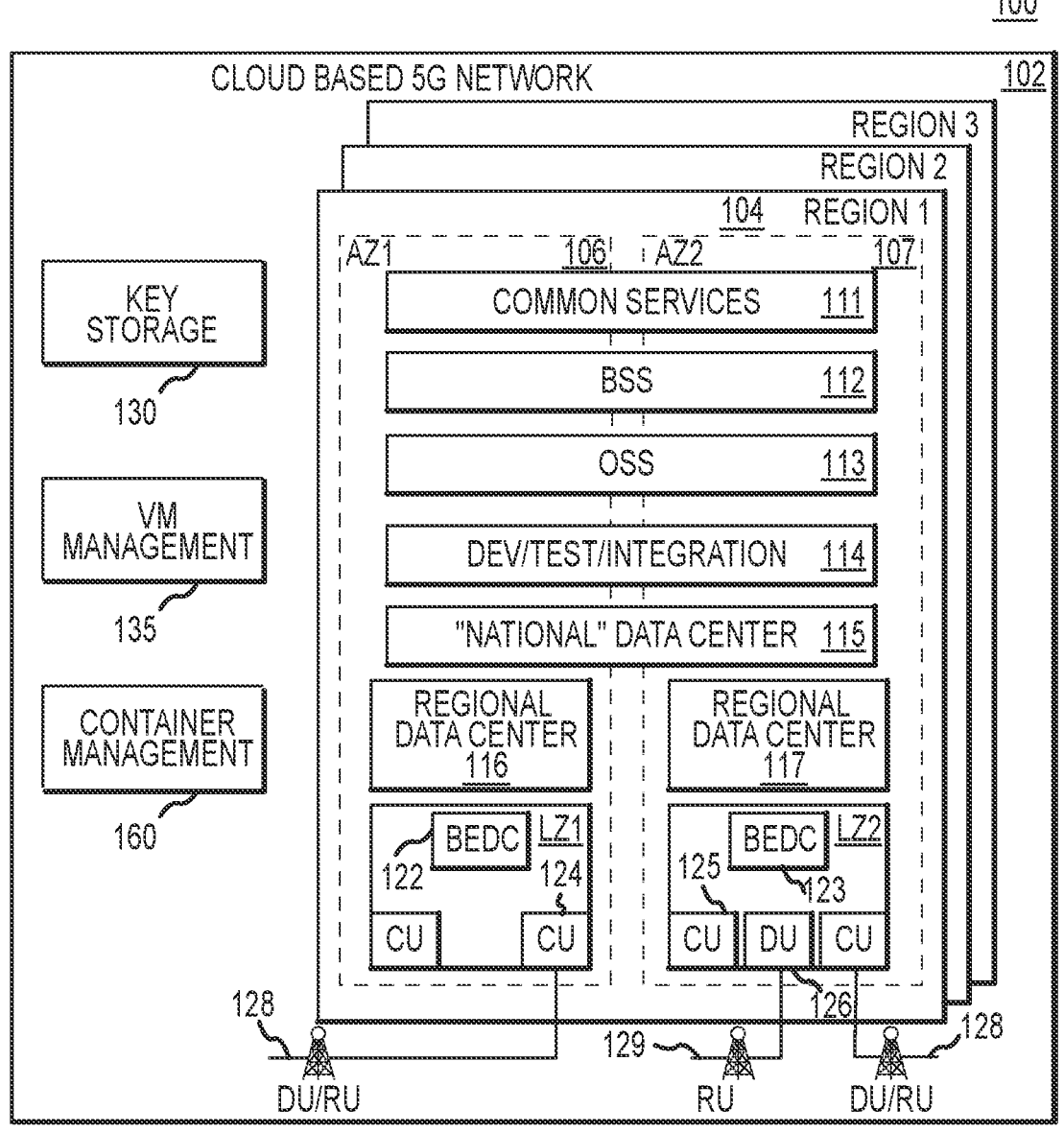
FIG. 1 illustrates an example architecture of a key management system for a 5G wireless network that is implemented with a cloud-based computing system.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Various systems, devices and automated processes maintain key security in cloud-based systems used to implement 5G wireless networks or the like. Generally speaking, the private key of an asymmetric key pair can be securely maintained in a "vault" or secure data storage for use in accessing secured resources by authenticated users. By creating a secure architecture in which private keys are generated, securely stored and then retrieved for subsequent use, a reliable yet secure service can be deployed within the cloud-based system.

The key management system described herein can be used to augment the security provided by the cloud service provider. While some cloud services have supported rudimentary forms of authenticated access to certain features, these have been limited in practice. The Amazon Web Services (AWS) platform, for example, has a secure session manager (SSM) feature that can be used to restrict access to certain cloud services. The AWS secure session manager provides access to certain services within the confines of the AWS system, but key access is restricted not only from users but also from the system administration. This means that applications or services that make use of keys generated outside of the AWS constructs cannot typically be directly accessed in a secure manner. Moreover, the SSM tool is not always available for even certain AWS services, thereby further limiting its usefulness in certain applications and settings. Other general-purpose security mechanisms in other cloud platforms similarly exhibit restrictions in terms of access to system administrator, flexibility, and/or the like. A need therefore exists for enhanced key management that supplements the features of the cloud service.

Various embodiments use asymmetric encryption techniques to generate private keys that can be maintained in secure storage for retrieval and use in a highly controlled manner. Conventional asymmetric cryptography makes use of dual keys that are generated in pairs. Typically, the key pair includes a "public" key (also called a "fingerprint") and a "private key". The public key can be shared with others without compromising security, while the private key is maintained in secure storage to prevent unauthorized access. Messages and other data encrypted with either key can be decrypted using the other key. Data encrypted with the private key, for example, can only be decrypted using the public key. Conversely, data encrypted with the public key can only be decrypted using the private key.

As noted above, asymmetric public/private key pairs can be used to gain access to certain secure resources within the data processing system. Keys can be used to access network services (e.g., privacy enhanced mail (PEM)), to create a new virtual machine (VM) or other network component, and/or for other purposes as desired. To that end, the private keys to an asymmetric key pair can be maintained within a secure vault that is accessed using appropriately secure mechanisms. Various embodiments enhance the security of the system by placing private keys in secure storage that even the authenticated user may not see in clear form.

In one example, the secure shell (SSH) protocol used by an authorized user is augmented using a plugin or the like that consults a key vault used to store private keys. If the authenticated user wishes to connect to a secured service from an SSH session, for example, the user supplies the public key for the appropriate service being accessed, and the SSH plugin is able to consult the user's profile to verify that proper access is allowed. If access is authorized, the plugin retrieves the appropriate private key from the vault and uses the private key to transparently provide access to the requested service. If access is not authorized, access can be denied as appropriate. In either case, the user is shielded from viewing the private key itself, thereby further preserving the secrecy (and therefore the integrity) of the private key. Other embodiments may use other protocols and structures in place of SSH, if desired.

With reference now to FIG. 1, a 5G wireless network 102 can be implemented using cloud-based computing resources, such as those available from Amazon Web Services Inc. (AWS) of Seattle, Washington and/or VMware Corporation of Palo Alto, California. Other cloud services are available from Microsoft Corp. of Redmond, Washington, IBM Corp. of Armonk, New York, and others. In the example of FIG. 1, network 102 encompasses data processing services supporting multiple regions 104, each having one or more availability zones (AZs) 106, 107 each acting as a separate data center with its own redundant power, network connectivity and other resources as desired. In some implementations, the various AZs operating within the same region will provide redundancy in the event that another AZ would fail or become overloaded. The example of FIG. 1 illustrates three regions, with region 104 having two AZs 106, 107, although other embodiments could include any number of regions and AZs providing any number of services and resources. The regions and zones are often described herein with reference to geographic locations, but in practice the regions and zones could be equivalently organized based upon customer density, user density, expected network demand, availability of electric power and/or bandwidth, and/or any other factors. As noted above, it will still be necessary to deploy radio units (RUs) within broadcast range of end users. But by implementing the other functions of the network using virtualized hardware operating within a cloud-type architecture, geographic restrictions upon the network 102 can be greatly reduced. This can provide substantial efficiencies in deployment and expansion of network 102, while also allowing for more efficient use of computing resources, data storage and electric power.

In example system 100, a network operator maintains one or more radio units (RUs) 128, 129 associated with a wireless network cell. Each RU 128, 129 suitably communicates with user equipment (UE) operating within a geographic area using one or more antennas/towers capable of transmitting and receiving messages within an assigned spectrum of electromagnetic bandwidth. In various embodiments, the assigned spectrum may be allocated across one or more guest networks to support multiple concurrent networks, if desired.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QoS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein.

In the example illustrated in FIG. 1, common services (e.g., billing, guest network allocation, etc.) can be performed in a shared service 111 across the available AZs 106, 107. Typically, these shared services will be implemented within a common virtual private cloud (VPC) operating within the cloud environment. Similarly, shared VPC systems can support business support system (BSS) 112, operational support services (OSS) 113, development/test/integration features 114, and/or the like across the entire region. A region wide data center (identified as a "national" data center 115 in FIG. 1) could be implemented in a shared VPC across AZs 106, 107, if desired, with subordinate data centers (e.g., "regional" data centers 116, 117) being separated into different VPCs for each of the AZs 106, 107. Additional levels of data centers could be provided, if desired, and/or the different data center functions could be differently organized in any number of equivalent embodiments. The various data centers could provide any number of services such as IP multimedia services (IMS), 5G core services and/or the like. Although FIG. 1 illustrates one example of a network implementation 100, equivalent embodiments could use other arrangements as desired.

In the example of FIG. 1, each AZ 106, 107 includes one or more breakout edge data centers (BEDCs) 122, 123 each supporting a local zone (e.g., LZ1, LZ2 respectively) with one or more RUs 128, 129. The BEDCs are ideally organized for very low latency to provide best possible throughput and low latency to the various user equipment operating within the local zone. BEDCs 120, 121 will typically implement one or more CUs (e.g., CUs 124, 125) in accordance with the O-RAN specifications. BEDCs may also implement user plane functions that handle user data sessions for gaming, streaming, messaging and/or other network services, as desired. Again, any number of BEDCs 122, 123 and other data centers may be implemented using any number of different or shared VPCs in the cloud environment, as desired.

As noted above, each of the various network components shown in FIG. 1 are typically implemented using software or firmware instructions that are stored in a non-transitory data storage (e.g., a disk drive or solid state memory) for execution by one or more processors within the VPC. VPCs may provide any number of additional features to support the data handling functions of the system, including redundancy, scalability, backup, key management and/or the like.

Each RU 128, 129 is typically associated with a different wireless cell that provides wireless data communications to any number of user devices operating within broadcast range of the cell. RUs 115 may be implemented with radios, filters, amplifiers and other telecommunications hardware to transmit digital data streams via one or more antennas. Generally, RU hardware includes one or more processors, non-transitory data storage (e.g., a hard drive or solid state memory) and appropriate interfaces to perform the various functions described herein. RUs are physically located on-site with the transmitter/antenna, as appropriate. Conventional 5G networks may make use of any number of wireless cells spread across any geographic area, each with its own on-site RU.

User devices are often mobile phones or other portable devices that can move between different cells associated with the different RUs, although 5G networks may also support home and office computing, industrial computing, robotics, Internet-of-Things (IoT) and many other devices. While the example illustrated in FIG. 1 shows just a few RUs 128, 129 for convenience, a practical implementation will typically have any number of RUs that can each be individually configured to provide highly configurable geographic coverage for the 5G network 102.

Further efficiencies can be realized through the use of a container orchestration system 160 such as KUBERNETES software or the like. An orchestration system 160 can be used to automate software deployment, scaling and network management. The KUBERNETES software is available from the Cloud Native Computing Foundation, although equivalent embodiments could use other management platforms as desired. In some implementations, AWS and/or VMware cloud services (among others) offer Kubernetes-based platforms to provide infrastructure-as-a-service (IaaS) functionality. Generally speaking, Kubernetes software (and the like) provide primitive structures that can collectively provide mechanisms to deploy, maintain and scale cloud-based applications based upon one or more processors, memory and/or other resources. Kubernetes allows the hardware of a data processing server to be abstracted and thereby implemented using cloud-based services such as AWS, VMware and/or the like.

Cryptographic keys and other security credentials may be maintained and processed in any manner. In the example of FIG. 1, a key vault or similar storage 130 is provided within the cloud architecture to maintain secure access to private keys. Key storage 130 may be suitably formatted as a secure database that permits private keys to be stored and later retrieved based upon the associated public key/fingerprint, as described more fully below. System 102 will also typically include a VM or other management feature 135 that provides administrative functionality relating to generating and maintaining the various VMs used to implement the various components of network 102. Generally, the management feature 135 will have access to the key storage database 130 for reading and writing keys generated for the various modules and services within system 102. By interacting with the management feature 135, then, keys can be securely accessed without necessarily being viewed or duplicated by individual users. VM management feature 135 could be implemented in any manner. In an example embodiment, the VMWARE INFRASTRUCTURE/VSPHERE product available from VMWare could be used to manage the various virtual machines that are spawned and de-spawned within system 102. Equivalent embodiments could use other products, as desired.

Figure 2:
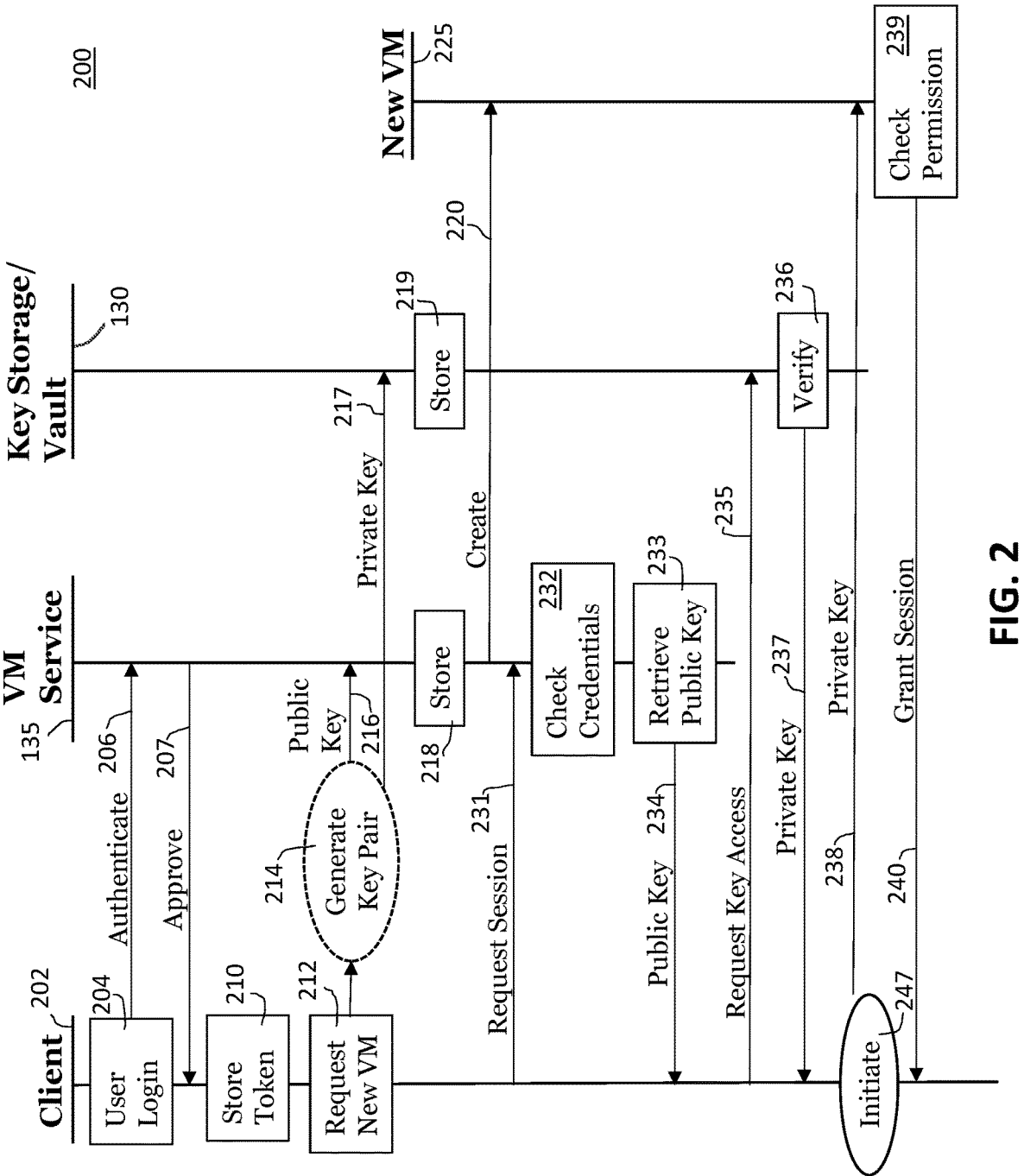
FIG. 2 illustrates an example process for creating a secure key and using the secure key to gain access to secured resources in a cloud-based data processing system.

With reference now to FIG. 2, various embodiments allow human and/or virtual actors executing client applications 202 to create new keys, as desired. Generally, the actor will be associated with an account on the cloud service 102 which may be maintained by VM service 135. Whether the actor is a human administrator or an automated process, the permissions to perform certain actions or to access certain resources, directories, databases or the like will generally be defined within VM service 135 according to that actor's account. Various embodiments may allow actors to inherit permissions or other attributes based upon class, group and/or the like. Accounts, permissions and the like may be set up within VM service 135, and/or any other administrative component of system 102. The actor's account may also assign permissions to perform certain actions (e.g., creating new VMs, connecting to certain types of VMs, sending messages, accessing certain types of data and/or the like) that can be enforced by the VM service 135 as appropriate.

Human and/or virtual actors may interact with the authenticator in any manner. In various embodiments, the actor interacts with a VM service 135 using a SSH or other client 202. Typically, the actor will login (function 204) to initiate contact 206 with VM service 135. After connecting to the VM service 135, the actor's identity may be authenticated using any sort of credentials such as userid/password, biometric (e.g., finger print, face or retina scan, etc.), two-factor authentication and/or the like to verify that the actor is indeed authorized to use the permissions set forth in the actor's account. If the credentials are not accepted, the client can be notified of the unsuccessful authentication, and optionally be allowed to re-enter new credentials. If the authentication is successful, the authenticated actor's client 202 will generally be provided with a cookie, token or the like 207. The received token can be stored (function 210) by the client so that it can be later presented to indicate that they have successfully identified themselves and been properly authenticated with the VM service 135.

When a new component 225 or service is created, a pair of asymmetric keys are generated (function 214) as appropriate to control access to the virtual machine (VM) that implements the new VM 225 of system 102. In the example of FIG. 2, the new VM 225 is initiated in response to a request from a user of client 202 (function 212). In other examples, new VMs 225 can be generated by other users or clients, or by automated processes within system 102 as desired. When the new VMs 225 are created, keys may be variously generated by key generation features of system 102, management system 135 or 160, client 202 or its plugin, and/or any other processing resources, as desired.

As noted above, actors may need access to a large number of different keys based upon the number of different resources that they need to access. Again, resources (and therefore keys) may be associated with groups or classes of actors, if appropriate. In an example embodiment, new VMs 225 are spawned by the container manager 160 and/or VM management 135, which are programmed to securely generate keys (function 214) as described herein. As the authenticated actor creates a new resource, then, the resource creator (e.g., VM service 135 and/or management system 160) creates new keys as needed.

New keys of any length are generated according to any known or subsequently developed protocol. In various embodiments, the secure shell (SSH) protocol defines a key generation technique that produces public/key private key pairs. In other embodiments, asymmetric keys may be generated according to the digital signature standard (DSS), IPsec, PGP, RSA, S/MIME and/or the like. Keys could equivalently be generated by services 135, 160 and/or other services in response to requests from the user's client application.

After the key pairs are generated, the private key is placed into the key vault storage 130 for safekeeping (function 217). Secure storage 130 maintains the key in a secure database or other restricted memory (function 219) so that only authenticated entities have access to the private keys. The public key/fingerprint can be provided to a VM service 135 or the like for storage and/or further processing as appropriate (functions 216, 218).

In the example of FIG. 2, new VMs can be created based upon the generated public key. That is, the VM service 135 assigns the public key 216 based upon the permissions associated with the actor (individual and/or group permissions). Put another way, the public key in the possession of the VM service 135 can be associated with one or more new VMs 225 spawned by VM service 135 (function 220), as desired.

For the actor to gain subsequent access to the VM, client 202 may use the SSH protocol or the like to request a session with the new component 225 (function 231). In this instance, an SSH plugin or the like is configured to obtain the public key 216 of the VM being accessed from the VM service 135 or the like. In the example of FIG. 2, the SSH plugin provides the client's authentication token to VM service 135 (function 231) to request a session with the new VM 225. VM service 135 suitably checks the received credentials (function 232). If the credentials are approved, VM service 135 retrieves the public key 216 associated with the requested resource 225 from storage (function 233) and provides it to the SSH plugin or other component of client 202 (function 234).

Client 202 can submit the received public key 216 via the SSH plugin to the secure storage 130 on behalf of the authorized actor (function 235). In various embodiments, the actor's token or other credentials are also submitted to the secure storage 130 with the request 235 so that the secure storage 130 can independently verify that the actor has permission to access the requested private key (function 236). If the actor's credentials are in order, then the plugin associated with client 202 is able to receive the private key 217 associated with the requested component 225 from the secure storage 130 (function 237). Secure storage 130 may be able to locate the private key 217 by using the public key 216 submitted with the request 235 in some embodiments. Alternately, the appropriate key 217 may be identified based upon other information available, such as the actor's or client's credentials. If everything is in order, then the key vault returns the private key 217 to the SSH plugin (function 237), which is then able to securely provide access to the requested VM (or other resource). If the credentials and/or key and/or permissions are not in order, then access can be denied.

The plugin associated with client 202 is then able to access the requested component 235 of network 102 using the received private key 217. The component validates the received key 217 as appropriate (function 239), and grants the session with client 202 if the key is in order (function 240). Access can be otherwise denied. As noted above, the plugin executed by the client 202 can be configured to restrict access to the private key 217 so that it cannot be viewed, stored, forwarded or otherwise duplicated. This maintains the security of the various components 225 of system 102.

If a user wishes to gain access to a particular component of network 102 for configuration, updating or other purposes, then, that user would initially login to the administrative system 135 using a SSH or similar client to obtain a valid credential. That credential could then be presented to obtain the public key associated with the requested component. The public key is received by the plugin, which can present the public key and any necessary authentication credentials to the secure storage 130, which can then retrieve the appropriate key used to gain access to the relevant component 235 of network 102. Components 235 are typically virtual machines (VMs) implementing any component of the 5G network 120, such as any of the distributed units (DUs) 126, centralized units (CUs) 124, data centers, service planes and/or any other component(s) of system 102.

By maintaining a secure key storage facility 130 and granting access to clients 202 only via an augmentation to the SSH or other protocol, secure access to components 225 of network 120 can be granted (or denied) across a wide array of services, even if the cloud provider's conventional resources do not support such functionality. Additionally, there is generally no need for the SSH plugin to provide the private key data to the actor, thereby restricting the actor's ability to clone or share the key in an unauthorized manner.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process to secure access by a client to a virtual machine (VM) component of a cloud-based data processing system that implements a 5G wireless network, the automated process comprising:

associating the component of the cloud-based data processing system with a cryptographic key pair comprising a public key and a private key;

storing the private key associated with the VM component in a secure digital storage and separately storing the public key associated with the VM component with a VM management service associated with the cloud based data processing system;

subsequently receiving, by the VM management service, a request for access to the VM component of the cloud-based data processing system by the client;

verifying the request for access to the VM component received from the client by the VM management service;

when the request for access is verified, providing the public key associated with the VM component of the cloud-based data processing system from the VM management service to the client in response to the request and otherwise denying access to the VM components;

subsequently receiving, by the secure digital storage, a session request from the client that comprises the public key associated with the VM component of the cloud-based data processing system that the client previously obtained from the VM management service; and responsively providing the private key associated with the VM component of the cloud-based data processing system from the secure digital storage to a secure plugin component associated with the client, wherein the secure plugin component associated with the client receives the private key and uses the private key obtained from the secure digital storage to provide access by the client to the VM component of the cloud-based data processing system without granting a user associated with the client access to view, store, forward and duplicate the private key that is associated with the VM component to there by maintain security of the VM components of the cloud-based data processing system.

2. The automated process of claim 1 further comprising authenticating the client with the VM management service, wherein the authenticating comprises providing the client with a digital credential upon successful authentication.

3. The automated process of claim 2 wherein the request for access to the VM component of the cloud-based data processing system by the client comprises the digital credential.

4. The automated process of claim 3 wherein the public key associated with the VM component of the cloud-based data processing system to the client is provided to the client in response to successful authentication of the digital credential received from the client.

5. The automated process of claim 1 wherein the secure plugin component augments a secure shell (SSH) protocol executed by the client.

6. The automated process of claim 5 wherein the VM component of the cloud-based data processing system is a virtual machine implementing a service of the 5G wireless network.

7. The automated process of claim 6 wherein the VM management service is a virtual machine management service executing on hardware associated with the data processing system.

8. The automated process of claim 7 wherein the VM management service is a VSPHERE service executed within the data processing system.

9. The automated process of claim 8 wherein the VM component of the cloud-based data processing system is a virtual machine implementing a centralized unit (CU) of the 5G wireless network.

10. The automated process of claim 6 wherein the secure digital storage comprises a database having restricted access.

11. A cloud-based data processing system that implements a 5G wireless network, the data processing system comprising a processor and memory configured to perform an automated process comprising:

associating a virtual machine (VM) component of the cloud-based data processing system with a cryptographic key pair comprising a public key and a private key;

storing the private key associated with the VM component in a secure digital storage and separately storing the public key associated with the VM component with a VM management service associated with the cloud based data processing system;

subsequently receiving, by the VM management service, a request for access to the VM component of the cloud-based data processing system from a client that is associated with a user;

verifying the request for access to the VM component by the VM management service;

when the request for access to the VM component is verified, then providing the public key associated with the VM component of the cloud-based data processing system to the client in response to the request, and otherwise denying access to the VM component;

subsequently receiving, by the secure digital storage, a session request from the client that comprises the public key associated with the VM component of the cloud-based data processing system that was previously provided to the client by the VM management service; and responsively providing the private key associated with the VM component of the cloud-based data processing system to a secure plugin component associated with the client, wherein the secure plugin component associated with the client receives the private key that is associated with the VM component and uses the private key to access the VM component of the cloud-based data processing system without granting the user associated with the client access to view, store, forward and duplicate the private key to thereby maintain security of the VM components of the cloud-based data processing system.

12. The cloud-based data processing system of claim 11 further comprising authenticating the client with the VM management service, wherein the authenticating comprises providing the client with a digital credential upon successful authentication.

13. The cloud-based data processing system of claim 12 wherein the request for access to the VM component of the cloud-based data processing system by the client comprises the digital credential, and wherein the public key associated with the VM component of the cloud-based data processing system is provided to the client in response to successful authentication of the digital credential received from the client.

14. The cloud-based data processing system of claim 11 wherein secure plugin component augments a secure shell (SSH) protocol executed by the client.

15. The cloud-based data processing system of claim 14 wherein the VM component of the cloud-based data processing system is a virtual machine implementing a service of the 5G wireless network.

16. The cloud-based data processing system of claim 11 wherein the secure digital storage is a portion of the memory having restricted access.

17. A data processing system to provide access by a client to a virtual machine (VM) component of a cloud processing system that implements a wireless network, the data processing system comprising:

a secure data storage configured to store a private key from an asymmetric key pair associated with the component of the cloud processing system; and a VM management system that comprises a processor configured to store a public key from the asymmetric key pair associated with the VM component of the cloud processing system, to perform an authentication of the client, and, upon successful authentication of the client, to provide the public key from the asymmetric key pair associated with the VM component of the cloud processing system to the client and to otherwise deny access to the VM component of the cloud processing system;

wherein a plugin is configured to augment a secure shell (SSH) protocol executed by the client, wherein if the authentication is successful, the plugin provides the public key associated with the VM component to the secure data storage to thereby retrieve the private key associated with the VM component from the secure storage to thereby provide access by the client to the VM component of the cloud processing system without granting access to view, store, forward and duplicate the private key to thereby maintain security of the VM components of the cloud-based data processing system.

18. The data processing system of claim 17 wherein the VM component is a virtual machine (VM) executed by the cloud-based data processing system.

19. The data processing system of claim 18 wherein the VM component implements a central unit CU of the wireless network.

20. The data processing system of claim 17 wherein the plugin is configured to provide the private key to the VM component without allowing direct access to the private key by a user of the client.

* * * * *